(12) United States Patent
Qu et al.

(10) Patent No.: US 12,256,722 B1
(45) Date of Patent: Mar. 25, 2025

(54) FISHING REEL WITH INTELLIGENT BRAKING

(71) Applicant: SHENZHEN BOSAIDONG TECHNOLOGY CO., LTD, Shenzhen (CN)

(72) Inventors: Huangshen Qu, Shenzhen (CN); Tianshi Cui, Shenzhen (CN)

(73) Assignee: SHENZHEN BOSAIDONG TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/935,431

(22) Filed: Nov. 2, 2024

(51) Int. Cl.
    | | |
    |---|---|
    | *A01K 89/01* | (2006.01) |
    | *A01K 89/0155* | (2006.01) |
    | *A01K 89/02* | (2006.01) |

(52) U.S. Cl.
    CPC ........ *A01K 89/01556* (2015.05); *A01K 89/02* (2013.01)

(58) Field of Classification Search
    CPC .............. A01K 89/0155; A01K 89/033; A01K 89/01556
    See application file for complete search history.

(56) References Cited

U.S. PATENT DOCUMENTS

| | | | |
|---|---|---|---|
| 6,412,722 B1 * | 7/2002 | Kreuser | A01K 89/01555 242/288 |
| 2022/0061292 A1 * | 3/2022 | Yasuda | A01K 89/015 |

FOREIGN PATENT DOCUMENTS

| | | | |
|---|---|---|---|
| CN | 203152309 U | * | 8/2013 |
| CN | 103766296 | | 5/2014 |
| CN | 118160695 | | 6/2024 |

\* cited by examiner

*Primary Examiner* — Emmanuel M Marcelo

(57) ABSTRACT

A fishing reel is provided. The fishing reel includes one or more sensors that can obtain a rotation frequency of a spool of the fishing reel during a casting. The casting corresponds to a casting mode of a plurality of casting modes. The fishing reel also includes a computing device. The computing device can determine a braking force corresponding to the rotation frequency and the casting mode, based on data of a plurality of braking forces. The data of the plurality of braking forces are pre-determined and stored in a memory of the fishing reel. The computing device can apply the braking force to the spool.

14 Claims, 8 Drawing Sheets

FISHING REEL WITH INTELLIGENT BRAKING

TECHNOLOGICAL FIELD

The present disclosure relates generally to a fishing reel, and in particular, to a fishing reel with intelligent braking that can adaptively control or change the braking force and improve a user's experience.

BACKGROUND

In fishing scenarios, when a user is casting using different casting modes or technologies, the rotational frequency of the spool or wire cup of the fishing reel may have a large fluctuation. Therefore, the conventional electromagnetic brake for fishing reels with a fixed braking frequency may not be adapted to low and high rotational frequencies of the spool. For example, when the rotational frequency of the spool is higher than the fixed braking frequency, the brake may not respond timely and cause line backlash or tangling. When the rotational frequency of the spool is lower than the fixed braking frequency, the braking force may be too large such that long distance cast may be hard to achieve.

Therefore, it would be desirable to have a device and method that takes into account at least some of the issues discussed above, as well as other possible issues.

BRIEF SUMMARY

Example embodiments of the present disclosure are directed to a fishing reel with intelligent braking, which can adaptively control or change the braking force applied to a spool of the fishing reel during a casting. In example embodiments, when a user is casting using different casting modes or technologies, the fishing reel with intelligent braking can adaptively match, control or change the braking force according to a current rotation frequency of the spool and the casting mode or technology being used. Also, in example embodiments, the fishing reel with intelligent braking can output different braking forces to control the rotational speed or frequency of the spool in different casting phases. The example embodiments can improve the accuracy of casting, achieve or facilitate long distance cast, and reduce or avoid line backlash or tangling.

The present disclosure thus includes, without limitation, the following example embodiments.

Some embodiments provide a fishing reel. The fishing reel comprises one or more sensors configured to obtain a rotation frequency of a spool of the fishing reel during a casting, the casting corresponding to a casting mode of a plurality of casting modes;
and a computing device comprising a memory and a processor, wherein the memory stores executable instructions that, in response to execution by the processor, cause the computing device to at least: determine a braking force corresponding to the rotation frequency and the casting mode, based on data of a plurality of braking forces, wherein the data of the plurality of braking forces are pre-determined and stored in the memory; and apply the braking force to the spool.

In some embodiments, the plurality of casting modes include general casting mode, pitching mode, long cast mode, large profile mode, light lure mode, and skipping mode.

In some embodiments, the data of the plurality of braking forces are pre-determined for the plurality of casting modes and for a plurality of rotation frequencies of the spool.

In some embodiments, the one or more sensors being configured to obtain the rotation frequency of the spool includes being configured to obtain a first rotation frequency of the spool and a second rotation frequency of the spool.

In some embodiments, the first rotation frequency corresponds to a rising phase of the casting, and the second rotation frequency corresponds to a declining phase of the casting.

In some embodiments, the computing device being caused to determine the braking force includes being caused to: determine a first braking force corresponding to the first rotation frequency and the casting mode; and determine a second braking force corresponding to the second rotation frequency and the casting mode.

In some embodiments, the computing device being caused to apply the braking force to the spool includes being caused to apply the first braking force to the spool during the rising phase and apply the second braking force to the spool during the declining phase.

In some embodiments, the computing device being caused to apply the braking force to the spool includes being caused to adaptively change the braking force according to a change of the rotation frequency.

Some embodiments provide a method implemented by a fishing reel. The method comprises obtaining a rotation frequency of a spool of the fishing reel during a casting, the casting corresponding to a casting mode of a plurality of casting modes; determining a braking force corresponding to the rotation frequency and the casting mode, based on data of a plurality of braking forces, wherein the data of the plurality of braking forces are pre-determined; and applying the braking force to the spool.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example embodiment described herein. This disclosure is intended to be read holistically such that any separable features or elements of the disclosure, in any of its aspects and example embodiments, should be viewed as combinable unless the context of the disclosure clearly dictates otherwise.

It will therefore be appreciated that this Brief Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other example embodiments, aspects and advantages will become apparent from the following detailed description taken in conjunction with the accompanying figures which illustrate, by way of example, the principles of some described example embodiments.

BRIEF DESCRIPTION OF THE FIGURE(S)

Having thus described example embodiments of the disclosure in general terms, reference will now be made to the accompanying figures, which are not necessarily drawn to scale, and wherein:

DETAILED DESCRIPTION

Figure 1A:
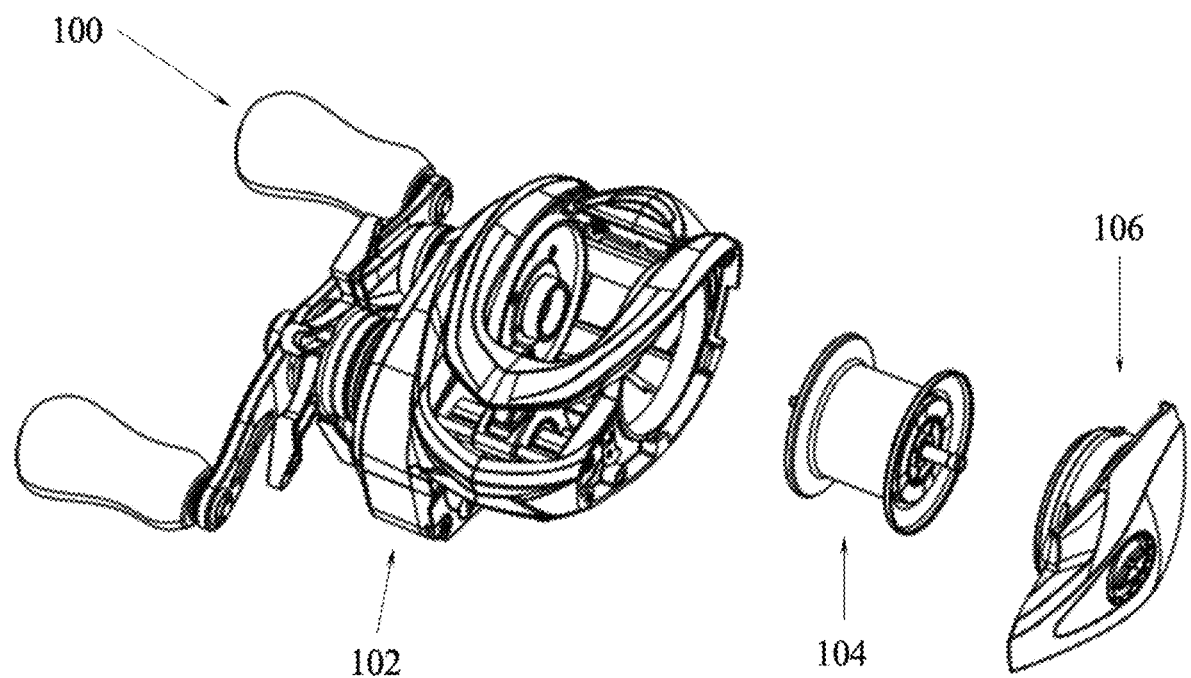
FIGS. 1A, 1B, 1C, 1D and 1E illustrate a fishing reel, according to some embodiments of the present disclosure.

Some embodiments of the present disclosure will now be described more fully hereinafter with reference to the accompanying figures, in which some, but not all embodiments of the disclosure are shown. Indeed, various embodiments of the disclosure may be embodied in many different forms and should not be construed as limited to the embodiments set forth herein; rather, these example embodiments are provided so that this disclosure will be thorough and complete, and will fully convey the scope of the disclosure to those skilled in the art. For example, unless otherwise indicated, reference something as being a first, second or the like should not be construed to imply a particular order. Like reference numerals refer to like elements throughout.

Figure 1B:
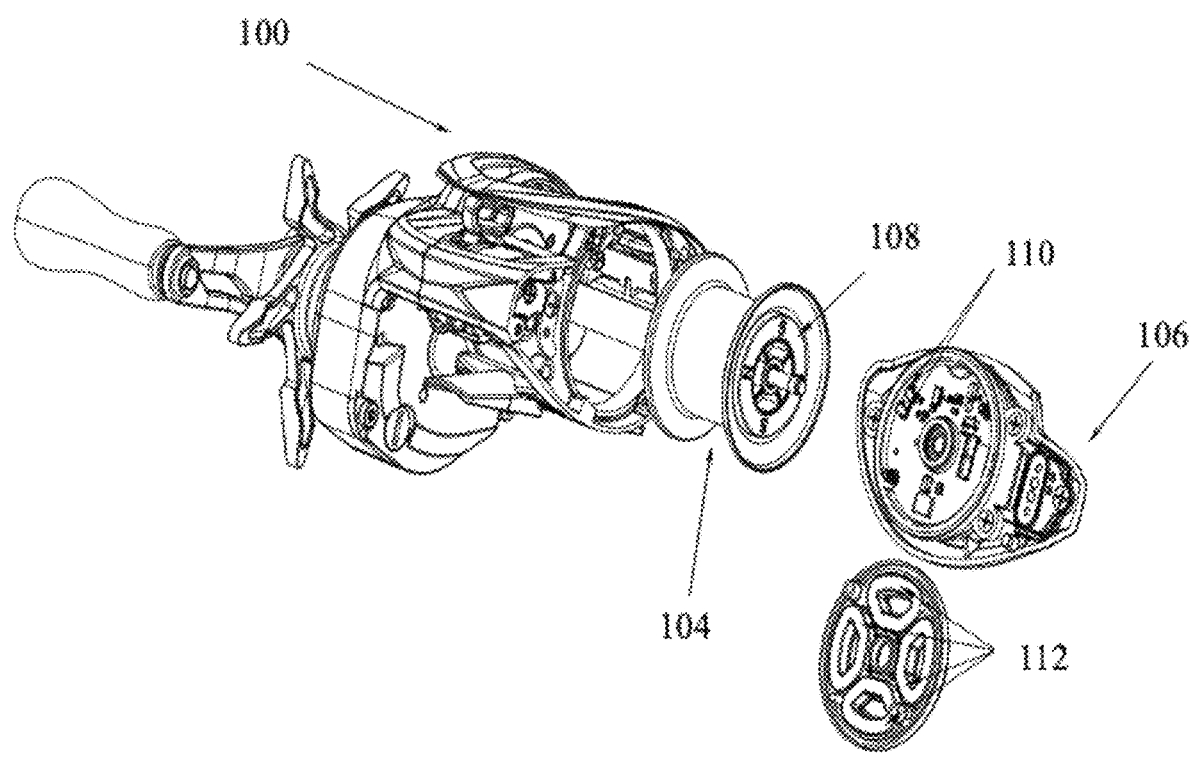

FIGS. 1A, 1B, 1C, 1D and 1E illustrate a fishing reel 100, according to some embodiments of the present disclosure. As shown in FIG. 1A, in some embodiments, the fishing reel may include a body part 102, a spool or wire cup 104 and a braking component 106. As shown in FIG. 1B, in some embodiments, the spool 104 may include a magnet 108. The braking component 106 may include one or more sensors 110 and one or more coils 112. The one or more sensors 110 may be Hall effect sensors or Hall sensors.

Figure 1C:
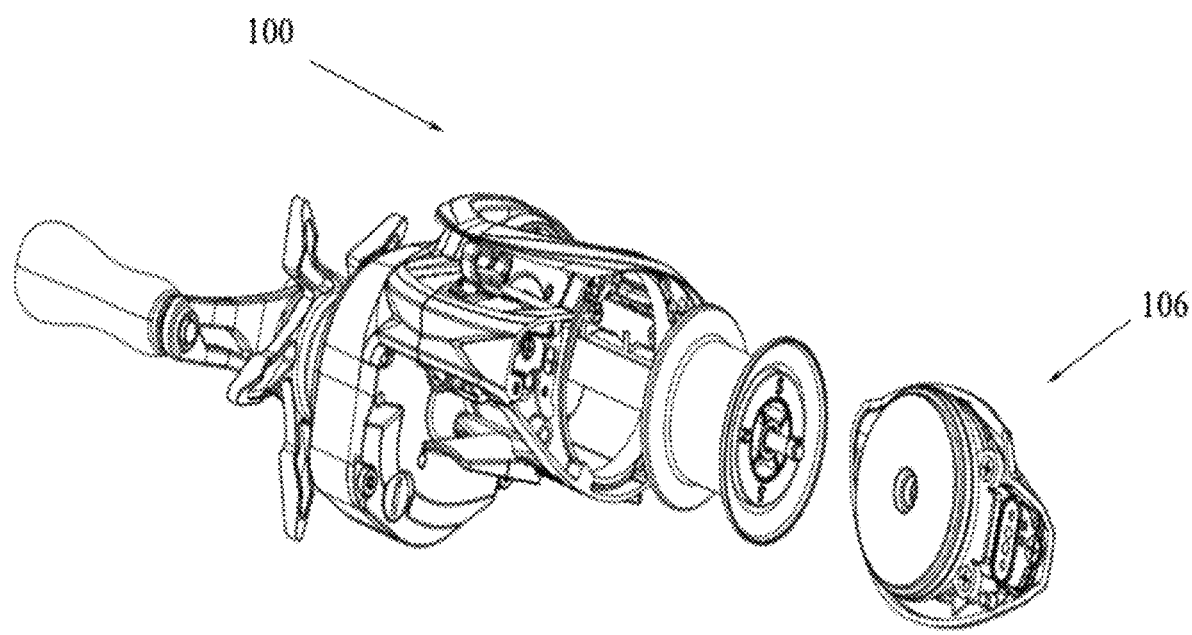
Figure 1D:
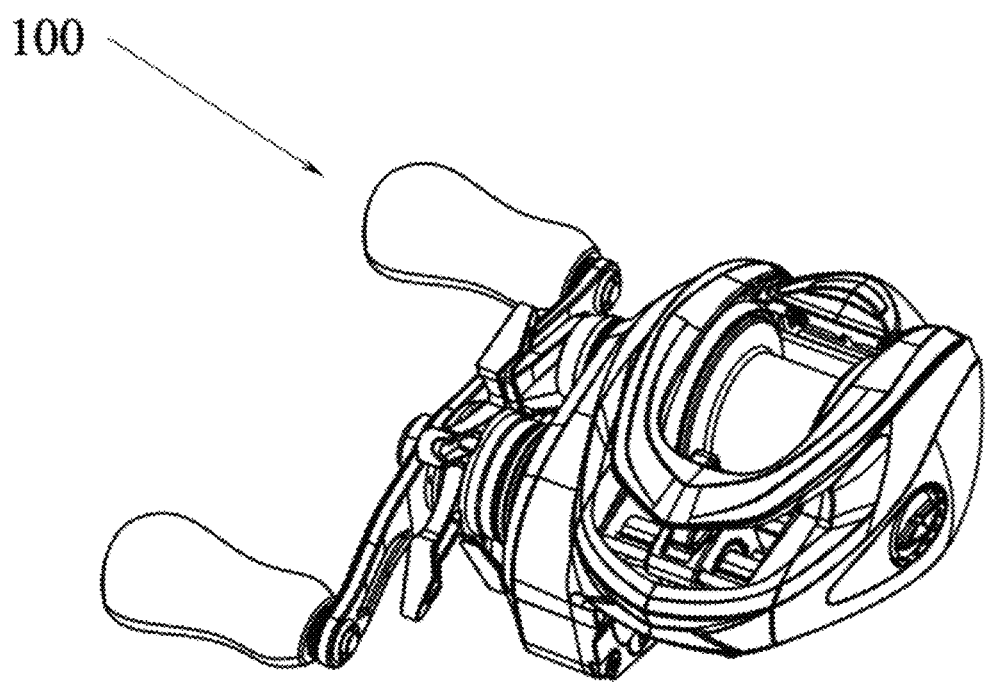

As shown in FIG. 1C, in some embodiments of the fishing reel 100, the one or more sensors 110 and one or more coils 112 are included inside of the braking component 106, thus are not shown in FIG. 1C. FIG. 1D illustrates that the body part 102, the spool 104 and the braking component 106 are assembled to constitute the fishing reel 100.

Figure 1E:
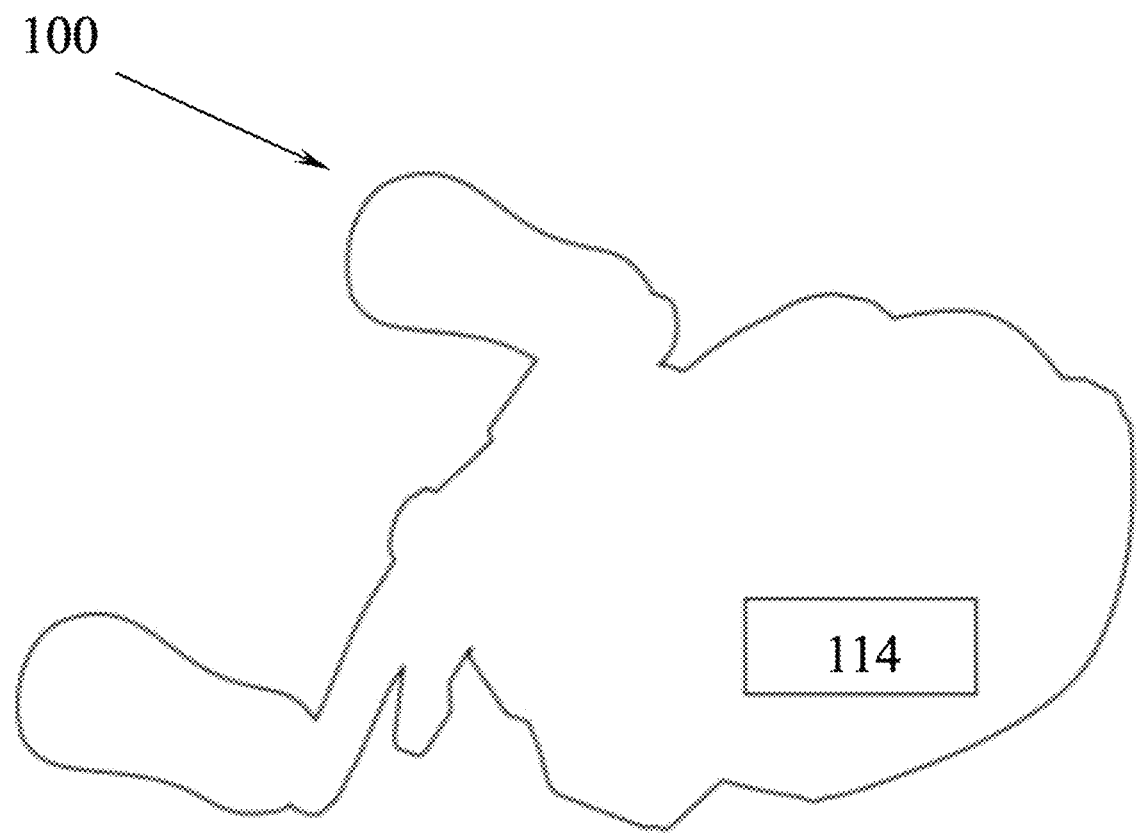

As shown in FIG. 1E, in some embodiments, the fishing reel 100 includes a computing device 114. In some embodiments, the computing device 114 may be included inside the fishing reel 100. In some embodiments, the computing device 114 may be installed on or attached to the outside surface of the fishing reel 100. In some embodiments, the one or more sensors 110 can communicate data with or transmit data to the computing device 114 through wireless or wired communications. In some embodiments, the computing device 114 may be a Bluetooth chip.

In some embodiments, the magnet 108 and the braking component 106 may constitute a braking system of the fishing reel 100. In some embodiments, the braking system of the fishing reel 100 may include an electromagnetic brake. The magnet 108 and the one or more coils 112 may generate electromagnetic induction. For example, the computing device 114 can send a signal to a MOSFET (Metal Oxide Semiconductor Field Effect Transistor) connected to the one or more coils 112. The signal to the MOSFET may cause the one or more coils 112 to be closed, i.e., the MOSFET is conducted by the signal. A magnetic field may be generated by the closed coils 112.

During a casting, the spool 104 can rotate to drive the magnet 108 on the spool 104 to rotate together. The rotating magnet 108 can cut the magnetic field generated by the closed coils 112, such that the closed coils 112 may generate a current and generate an opposite magnetic field. The opposite magnetic field can reduce or impede the rotation of the spool 104 to brake the fishing reel 100 until the one or more coils 112 are stopped or not moving.

In some embodiments, the one or more sensors 110 can obtain a rotation frequency of the spool 104 of the fishing reel 100 during a casting. For example, the magnet 108 mounted on the spool 104 are in four stages N-S-N-S(N indicates north, and S indicates south), and the magnet 108 rotates when the spool 104 rotates. The sensors 110 may be installed in or on the braking component 106, and aligned with the magnet 108. When the spool 104 rotates a circle, the sensors 110 may sense a change in polarity such as N-S-N-S, and the sensors 110 may output a 0-1-0-1 digital signal (0 indicates a low level, and 1 indicates a high level) to the computing device 114. When the computing device 114 receives the 0-1-0-1 signal, the computing device 114 can know that the spool 104 rotates a circle, and then can calculate the rotation frequency of the spool 104 based on time used to receive the 0-1-0-1 signal.

In some embodiments, the casting may correspond to a casting mode of a plurality of casting modes. In some embodiments, the plurality of casting modes or technologies include general casting mode, pitching mode, long cast mode, large profile mode, light lure mode, and skipping mode.

In some embodiments, the general casting mode may refer to a mode that is suitable for most fishing situations. This mode typically applies a moderate braking force to control the casting of various lure types and weights. With its adaptability to different fishing situations and lure choices, the general casting mode enables anglers to respond flexibly to a wide range of fishing scenarios.

In some embodiments, the pitching mode may refer to a mode for placing lures into tight spots like grass edges, docks, and other obstacles at short range, by holding the lure and quickly releasing it with a controlled line tension. In this mode, the braking force can be set low to reduce line resistance. The pitching mode may provide smoothness and accuracy, giving anglers better control over placement in tight or complex environments.

In some embodiments, the long cast mode may refer to a mode to maximize casting distance. In this mode, the braking force can be set lower to reduce line resistance for smoother casting, making it ideal for open water, heavier lures, and low-drag baits. The long-cast mode may provide both casting distance and stability, allowing anglers to cover a broader area with ease.

In some embodiments, the large profile mode may refer to a mode suitable for lures with a substantial profile, such as large soft baits or wide-bodied lures. In this mode, the braking force can be set higher to improve line control and reduce the risk of line backlash due to wind drag. The large profile mode may provide casting stability and control, allowing anglers to cast larger profile lures.

In some embodiments, the light lure mode may refer to a mode suitable for casting lightweight lures, such as small soft baits and small hard baits. In this mode, the braking force cam be set lower to reduce line resistance, allowing light lures to cast smoothly and reach the intended distance. The light lure mode may provide casting finesse and control, making it suitable for precise fishing techniques and tight fishing areas.

In some embodiments, the skipping mode may refer to a mode to create a skipping effect, where the lure contacts the water surface multiple times by casting with force and a low-angle trajectory close to the water. This mode typically applies a higher braking force to prevent line backlash caused by rapid deceleration as the lure hits the water. The skipping mode may be especially useful in areas with surface obstacles, allowing anglers to reach under cover or low-hanging vegetation, effectively drawing the attention of the target fish.

Figure 2:
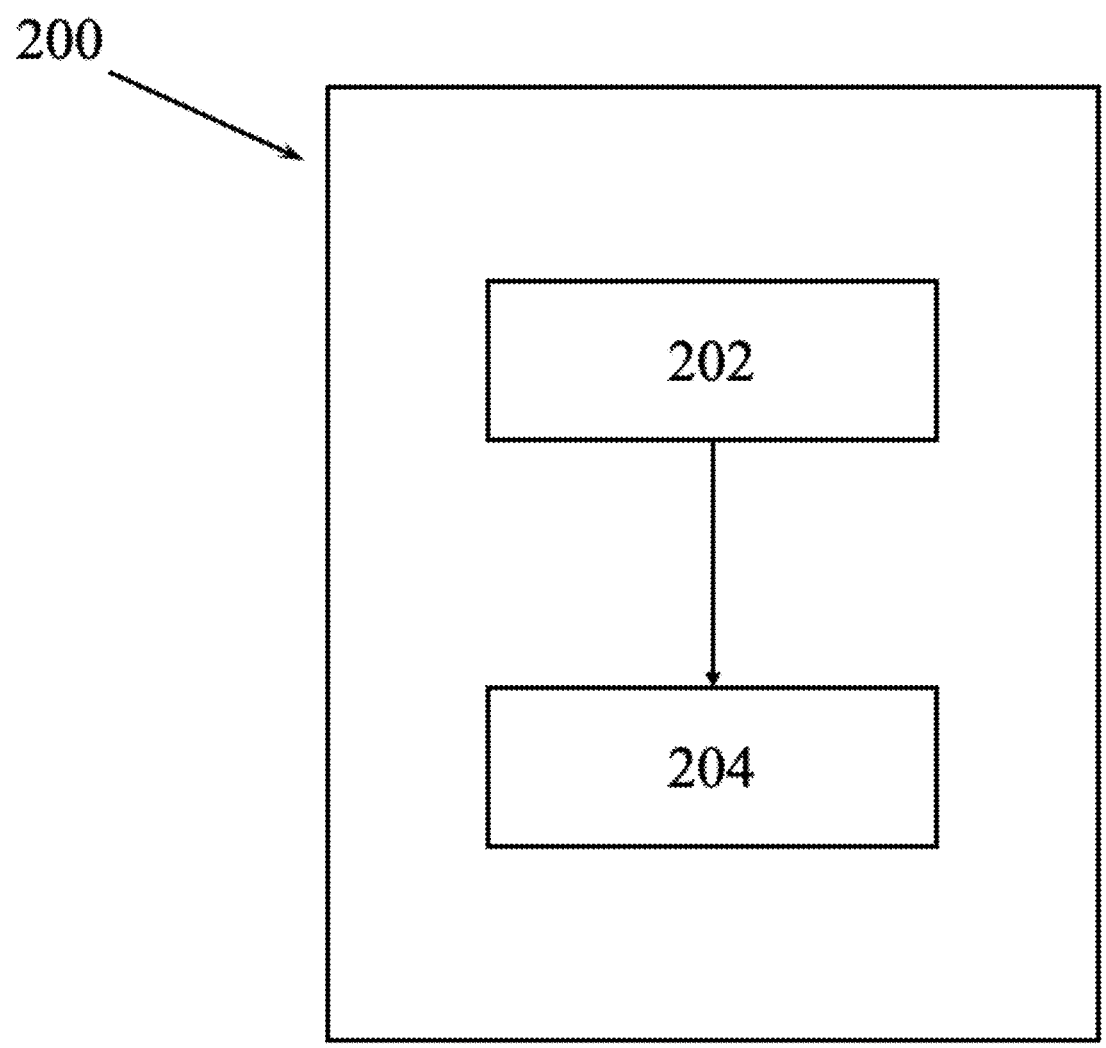
FIG. 2 illustrates a processing system for a fishing reel, according to some embodiments of the present disclosure.

FIG. 2 illustrates a processing system 200, according to some embodiments of the present disclosure. The processing system 200 includes a determination module 202 and a control module 204. The processing system 200 may be implemented by the computing device 114 as described above in FIG. 1E. In some examples, as described in greater detail with reference to FIG. 3, the processing system 200 may be implemented by the computing device 300 comprising a processor 302 and a memory 304. The processing system 200 will be described in details below.

In some embodiments, the sensors 110 can provide the rotation frequency of the spool 104 to the determination module. And the determination module 202 (implemented by the computing device 114 or 300) can determine a braking force corresponding to the rotation frequency of the spool 104 and the casting mode, based on data of a plurality of braking forces. The data of the plurality of braking forces are pre-determined and stored in a memory, for example the memory 304.

In some embodiments, different casting modes are corresponding to different fishing scenarios. Different casting modes may correspond to different rotation frequencies, which may require different braking forces. Thus, data of a braking force may be constructed for each casting mode. And for each casting mode, data of the braking force may be the braking force needed or desired for a rotation frequency of the spool. The greater the braking force, the greater the resistance to the rotation of the spool.

In some embodiments, data of the plurality of braking forces are pre-determined by using or testing a prototype of the fishing reel 100. For example, basic data of braking force can be preset in the computing device of the prototype. Multiple testers can test the prototype using the plurality of casting modes. The multiple testers may be professional fishing enthusiasts or anglers who can use the plurality of casting modes skillfully.

In some embodiments, sensors in the prototype may obtain the rotation frequency of the spool during a test casting, and transmit the rotation frequency to the computing device of the prototype. The computing device can calculate a braking force and output the calculated braking force according to the basic data of the braking force. The computing device can also report the rotation frequency of the spool and the calculated braking force to an application (App) of a cell phone or a personal computer (PC). The testers can modify the calculated braking force in the App or PC based on their experience, the casting distance, lure type, and casting mode used in the test casting. Then data of the modified braking force can be written into the computing device of the prototype. The testers can use data of the modified braking force as basic data of braking force and test the prototype again, until an optimal or desired braking force is found. The optimal or desired braking force can be stored in the memory of the computing device of the fishing reel 100.

In some embodiments, the data of the plurality of braking forces are pre-determined for the plurality of casting modes and for a plurality of rotation frequencies of the spool 104. For example, for each of the plurality of casting modes, a plurality of rotation frequencies or frequency ranges can be pre-defined based on actual requirement or actual situation in that specific casting mode. The plurality of rotation frequencies or frequency ranges for a specific casting mode can be pre-defined by testing the prototype of the fishing reel 100, similarly as described above.

In some embodiments, for a specific casting mode of the plurality of casting modes, a desired braking force can be pre-determined for each of the plurality of rotation frequencies pre-defined for that specific casting mode. For example, data reflecting the below Table 1 can be pre-determined and stored in the memory of the computing device of the fishing reel 100.

TABLE 1

| Rotation Frequency | Casting Mode | | | | | |
|---|---|---|---|---|---|---|
| | 1 | 2 | 3 | 4 | 5 | 6 |
| Q1 | A1% | B1% | C1% | D1% | E1% | F1% |
| Q2 | A2% | B2% | C2% | D2% | E2% | F2% |
| ... | ... | ... | ... | ... | ... | ... |
| Qi | Ai% | Bi% | Ci% | Di% | Ei% | Fi% |

As shown in Table 1, i rotation frequency ranges (Q1-Qi) are pre-defined for 6 casting modes. Q1-Qi each may be a rotation frequency range, for example, Q1 may be a range from 125 Hz to 250 Hz. For each casting mode, a braking force is predetermined for each of the i rotation frequency ranges. For example, for casting mode 1, which may be the general casting mode, for rotation frequency range Q1, the desired braking force is A1%. Here the desired braking force is indicated or represented by duty cycle. For example, when the rotation frequency is 200 Hz, the spool 104 rotates a circle using 1/200=0.005 seconds. A braking force of 50% duty cycle means a preset force is applied to the spool for a duration of 0.0025 seconds during the circle. The greater the duty cycle, the longer duration the preset force applied to the spool during a circle.

In some embodiments, from Q1-Qi, the rotation frequencies may be increasing, i.e., Q1<Q2< . . . <Qi. Accordingly, for each casting mode, the braking force for Q1-Qi may be also increasing, for example, A1%<A2%< . . . <Ai %. For example, for casting mode 1, the sensors 110 can obtain the rotation frequency of the spool 104 during a casting, if the obtained rotation frequency is in the frequency range Q2, the determination module 202 can determine a braking force A2% corresponding to the obtained rotation frequency and the casting mode 1.

In some embodiments, for each casting mode, there are multiple gear levels. For each rotation frequency range from Q1-Qi, a desired braking force can be pre-determined for each of the multiple gear levels, similarly as described above. For example, for casting mode 1, which may be the general casting mode, data reflecting the below Table 2 can be pre-determined and stored in the memory of the computing device of the fishing reel 100. Similar data for other casting modes can be also pre-determined and stored in the memory of the computing device of the fishing reel 100.

| Rotation Frequency | Gear Level | | | |
|---|---|---|---|---|
| | 0 | 1 | ... | X |
| Q1 | A10% | A11% | ... | A1X% |
| Q2 | A20% | A21% | ... | A2X% |
| ... | ... | ... | ... | ... |
| Qi | Ai0% | Ai1 % | ... | AiX% |

As shown in Table 2, there may be X gear levels, e.g., X=10. For example, for rotation frequency range Q1, the desired braking force is A10% for gear level 0. From Q1-Qi, the rotation frequencies may be increasing, i.e., Q1< Q2< ... <Qi. Accordingly, for casting mode 1, at the same gear level, e.g., gear level 0, the braking force for Q1-Qi may be also increasing, for example, A10%<A20%< ... <Ai0%. For the same rotation frequency range, e.g., Q1, the braking force for gear level 0-X may be increasing, for example, A10%<A11%< ... <A1X %.

In some embodiments, the gear level can be manually selected or changed by the user on the fishing reel 100. The computing device 114 can obtain the position information of the gear level at certain time interval e.g., every second. For example, the fishing reel 100 may include a rotary encoder. When the user selects or changes the gear level using the rotary encoder, the rotary encoder can send a signal to the computing device 114 indicating the position information of the selected or changed gear level. The determination module 202 can determine the braking force for the current gear level, corresponding to the rotation frequency and the casting mode, e.g., as shown in Table 2.

In some embodiments, the determination module 202 can transmit or provide the determined braking force corresponding to the rotation frequency and the casting mode to the control module 204. The control module 204 can apply the braking force (e.g., indicated by duty cycle) provided by the determination module 202 to the spool 104. For example, the control module 204 (implemented by the computing device 114 or 300) can send a signal to the MOSFET connected to the one or more coils 112, to cause the one or more coils 112 to be closed as indicated by the duty cycle. The magnetic field generated by the closed coils 112 may be cut by the rotating magnet 108 to generate an opposite magnetic field that can reduce or impede the rotation of the spool 104 to brake the fishing reel 100.

In some embodiments, the one or more sensors 110 can obtain a first rotation frequency of the spool 104 and a second rotation frequency of the spool 104. In some embodiments, the first rotation frequency corresponds to a rising phase of the casting, and the second rotation frequency corresponds to a declining phase of the casting. In some embodiments, the rising phase of the casting may be a first phase of the casting due to the throw of the lure. During the rising phase, the rotation frequency of the spool 104 is increasing, e.g., increasing to a maximum frequency such as 800 Hz. The declining phase of the casting may be a second phase after the rising phase of the casting, and during the declining phase, the rotation frequency of the spool 104 is decreasing, e.g., decreasing to zero.

In some embodiments, the determination module 202 (implemented by the computing device 114 or 300) can determine a first braking force corresponding to the first rotation frequency and the casting mode, and determine a second braking force corresponding to the second rotation frequency and the casting mode. The first rotation frequency corresponds to a rising phase of the casting, and the second rotation frequency corresponds to a declining phase of the casting, similarly as described above. The first braking force may be different from the second braking force.

In some embodiments, at the beginning of the rising phase of the casting, e.g., the rotation frequency of the spool 104 is 0-125 Hz, the control module 204 may not apply any braking force to the spool. When the rotation frequency of the spool 104 reaches or exceeds a value, e.g., >125 Hz, the control module 204 can apply or start to apply a braking force to the spool, e.g., A1% or A10%, as described above.

On the other hand, during the rising phase of the casting, when the rotation frequency of the spool 104 reaches or exceeds a value, e.g., >500 Hz, the control module 204 can apply a maximum braking force for rotation frequency equal to or higher than the value such as 500 Hz, e.g., Ai % or Ai0%, as described above.

In some embodiments, data reflecting Table 1 and Table 2 are only applied to the rising phase of the casting, but not applied to the declining phase of the casting. In some embodiments, for the declining phase of the casting, for a casting mode, the determination module 202 can calculate a candidate braking force as:

$$\frac{\text{obtained rotation frequency}}{\text{maximum rotation frequency}} \times declinling\ fator.$$

The candidate braking force is still indicated by duty cycle.

In some embodiments, the obtained rotation frequency may be obtained by the sensors 110. The maximum rotation frequency may be 800 Hz. For different casting modes, the maximum rotation frequency may be different. In some embodiments, the declining factor can be pre-determined by testing the prototype for each casting mode as describe above. Similarly, there can be multiple gear levels for the declining phase, and the declining factor can be pre-determined by testing the prototype for each casting mode in each gear level. The declining factor may be from 0-100% as tested. The gear levels for the declining phase may be different from or the same as the gear levels for the rising phase.

In some embodiments, for the declining phase of the casting, a maximum braking force and a minimum braking force can be preset or pre-determined by testing the prototype and stored in the memory of the computing device. If the candidate braking force is less than or equal to the minimum braking force, the determination module 202 can determine the minimum braking force as the desired braking force. If the candidate braking force is larger than or equal to the maximum braking force, the determination module 202 can determine the maximum braking force as the desired braking force. Otherwise, the determination module 202 can determine the candidate braking force as the desired braking force.

In some embodiments, for the same rotation frequency or frequency range, the desired braking force may be different or the same during the rising phase and the declining phase. For example, for casting mode 1, which may be the general casting mode, during the rising phase, for a rotation frequency q within the range of Q1, the desired braking force is A1%. During the declining phase, for the same rotation frequency q, the determination module 202 can determine the desired braking force as described above, which may be different from or the same as A1%.

In some embodiments, the sensors 110 may obtain the current casting distance in a casting. The determination module 202 can determine the desired braking force as the ratio between the current casting distance and the target casting distance, still indicated by duty cycle. The current casting distance may be the flight distance of the lure before landing, and the target casting distance may be the preset or desired landing distance of the lure. For example, the sensors 110 may obtain or measure that the current casting distance is 40 meters, and the target casting distance is 50 meters. Thus the braking force is 80%, indicated by duty cycle.

In some embodiments, the control module 204 (implemented by the computing device 114 or 300) can apply the first braking force to the spool 104 during the rising phase, and apply the second braking force to the spool 104 during the declining phase. For example, similarly as described above, during the rising phase, the control module 204 can send a first signal to the MOSFET connected to the one or more coils 112, to cause the one or more coils 112 to be closed as indicated by a first duty cycle for the rising phase. During the declining phase, the control module 204 can send a second signal to the MOSFET connected to the one or more coils 112, to cause the one or more coils 112 to be closed as indicated by a second duty cycle for the declining phase.

In some embodiments, the determination module 202 can determine whether the casting is in the rising phase or in the declining phase. The determination module 202 can determine that the casting has entered the declining phase from the rising phase, if the number of consecutive times that the current rotation frequency of the spool 104 is less than the previous rotation frequency reaches a preset number of times, e.g., 5 times. For example, the sensors can obtain rotation frequencies q1, q2, q3, q4, q5, q6 for 6 consecutive time moments t1, t2, t3, t4, t5, t6 and provide to the determination module 202. If q1>q2>q3>q4>q5>q6, the determination module 202 can determine that the casting has entered the declining phase from the rising phase, and apply the second braking force to the spool 104 during the declining phase. Otherwise, the determination module 202 can determine that the casting is still in the rising phase, and apply the first braking force to the spool 104 during the rising phase.

In some embodiments, the control module 204 can adaptively change the braking force according to a change of the rotation frequency. For example, during the casting, the rotation frequency is continuously changing, the sensors 110 may obtain the changing rotation frequency of the spool at a time interval, e.g., every millisecond. The determination module 202 can determine the braking force at the same time interval, as described above. And the braking force may be also changing since the rotation frequency is changing. And the control module 204 can apply the changing braking force at the same time interval to the spool.

In some embodiments, a user may select or change the casting mode or technology using an App of a cellphone. And the App can send a signal indicating the selected casting mode to the computing device 114. The computing device 114 may include WiFi or Bluetooth transmitters and/or receivers and can communicate with the cell phone. The computing device 114 may determine a braking force corresponding to the rotation frequency and the casting mode being used by the user, as described above. If the user does not select or change the casting mode using the App, the computing device 114 may determine the braking force corresponding to the rotation frequency and the general casting mode.

In some embodiments, when the fishing reel 100 has power, the computing device 114 may estimate the casting mode that the user is using, e.g., based on the user's casting posture, and then determine the braking force corresponding to the rotation frequency and the estimated casting mode, without using the App of the cellphone. In some embodiments, the fishing reel 100 may be charged with electricity using a USB interface.

According to example embodiments of the present disclosure, the processing system 200 and its subsystems including the determination module 202 and control module 204 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

By implementing the braking force to the spool as described above, accuracy of casting may be improved, long distance cast may be achieved or facilitated, and line or wire backlash or tangling may be reduced or avoided.

Figure 3:
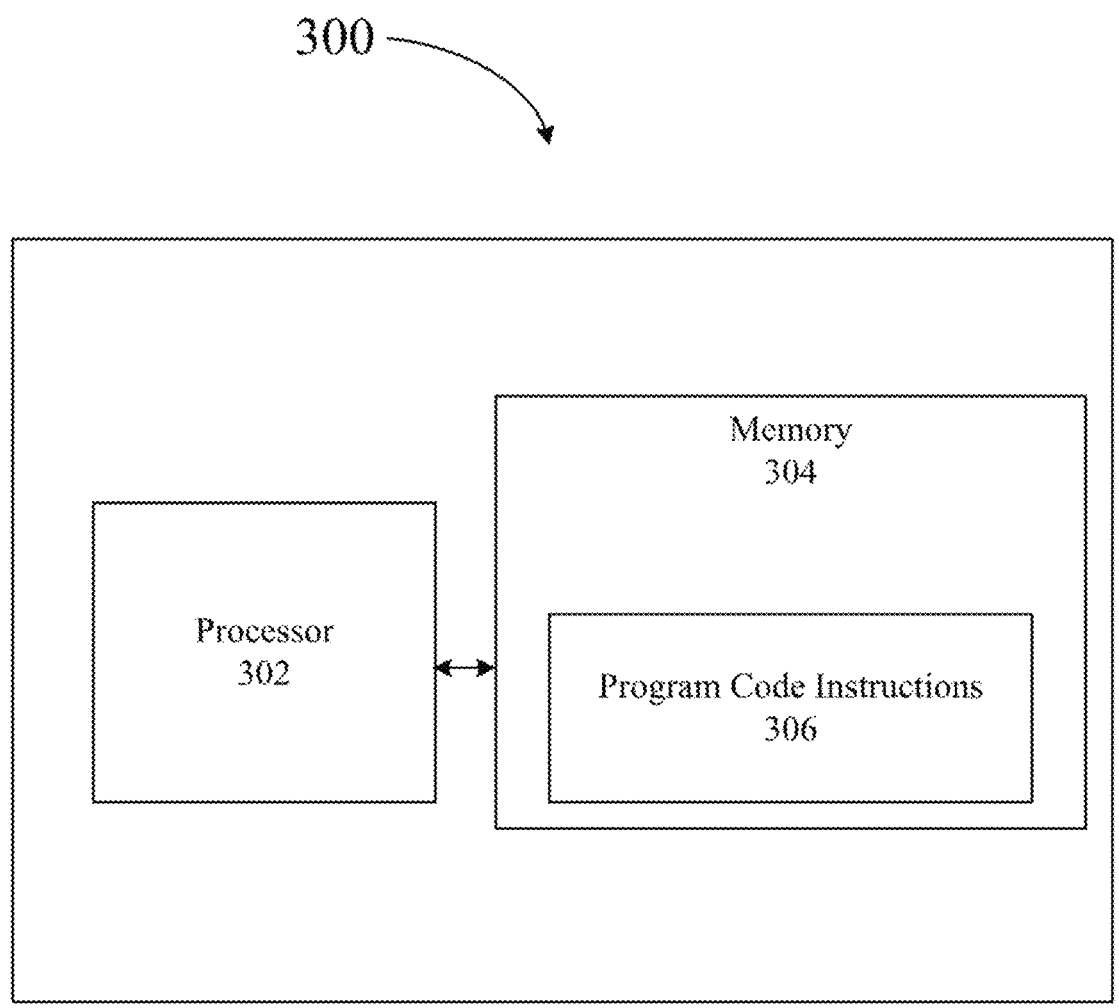
FIG. 3 illustrates a computing device of a fishing reel, according to some embodiments of the present disclosure.

FIG. 3 illustrates a computing device 300, according to some embodiments of the present disclosure. The computing device 300 may correspond to the computing device 114, as descried above in FIG. 1E. The computing device 300 may implement the processing system 200, as descried above in FIG. 2.

As shown in FIG. 3, in some embodiments, the computing device 300 includes a processor 302 and a memory 304 coupled to the processor 302. In some examples, the processor 302 may itself include the memory 304.

In some examples, the processor 302 may be a microprocessor or microcontroller unit (MCU). The processor 302 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 304 (of the same or another apparatus).

The processor 302 may be a number of processors, a multi-core processor or some other type of processor, depending on the particular embodiment. Further, the processor may be implemented using a number of heterogeneous processor systems in which a main processor is present with one or more secondary processors on a single chip. Although the processor may be capable of executing a computer program to perform one or more functions, the processor of various examples may be capable of performing one or more functions without the aid of a computer program. In either instance, the processor may be appropriately programmed to perform functions or operations according to example embodiments of the present disclosure.

In some examples, the memory 304 may be a computer-readable storage medium. The computer-readable storage medium is a non-transitory device capable of storing information, and is distinguishable from computer-readable transmission media such as electronic transitory signals capable of carrying information from one location to another. The memory 304 is generally any piece of computer hardware that is capable of storing information such as, for example, data, computer programs (e.g., computer-readable program code instructions 306) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. In some embodiments, the determination module 202 and the control module 204 can be stored in the memory 304.

In some embodiments, the memory 304 stores computer-readable program code instructions 306. The processor 302 is configured to execute computer-readable program code instructions 306 stored in the memory 304. Execution of the program code instructions may produce a computer-implemented process such that the instructions executed by the computer, processor or other programmable apparatus provide operations for implementing functions described herein. Execution of instructions by a processor, or storage of instructions in a computer-readable storage medium, supports combinations of operations for performing the specified functions described herein. It will also be understood that one or more functions, and combinations of functions, may be implemented by special purpose hardware-based computer systems and/or processors which perform the specified functions, or combinations of special purpose hardware and program code instructions.

In some embodiments, the processor 302 is configured to execute computer-readable program code instructions 306 stored in the memory 304, such that the computing device 300 can be caused to determine a braking force corresponding to the rotation frequency and the casting mode, based on data of a plurality of braking forces, as described above. The data of the plurality of braking forces are pre-determined and stored in the memory 304. The computing device 300 can be also caused to apply the braking force to the spool.

In addition to the memory 304, the processor 302 may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus (es), network(s) or the like. The communications interface may be configured to transmit and/or receive information by physical (wired) and/or wireless communications links. Examples of suitable communication interfaces include a network interface controller (NIC), wireless NIC (WNIC) or the like.

Figure 4:
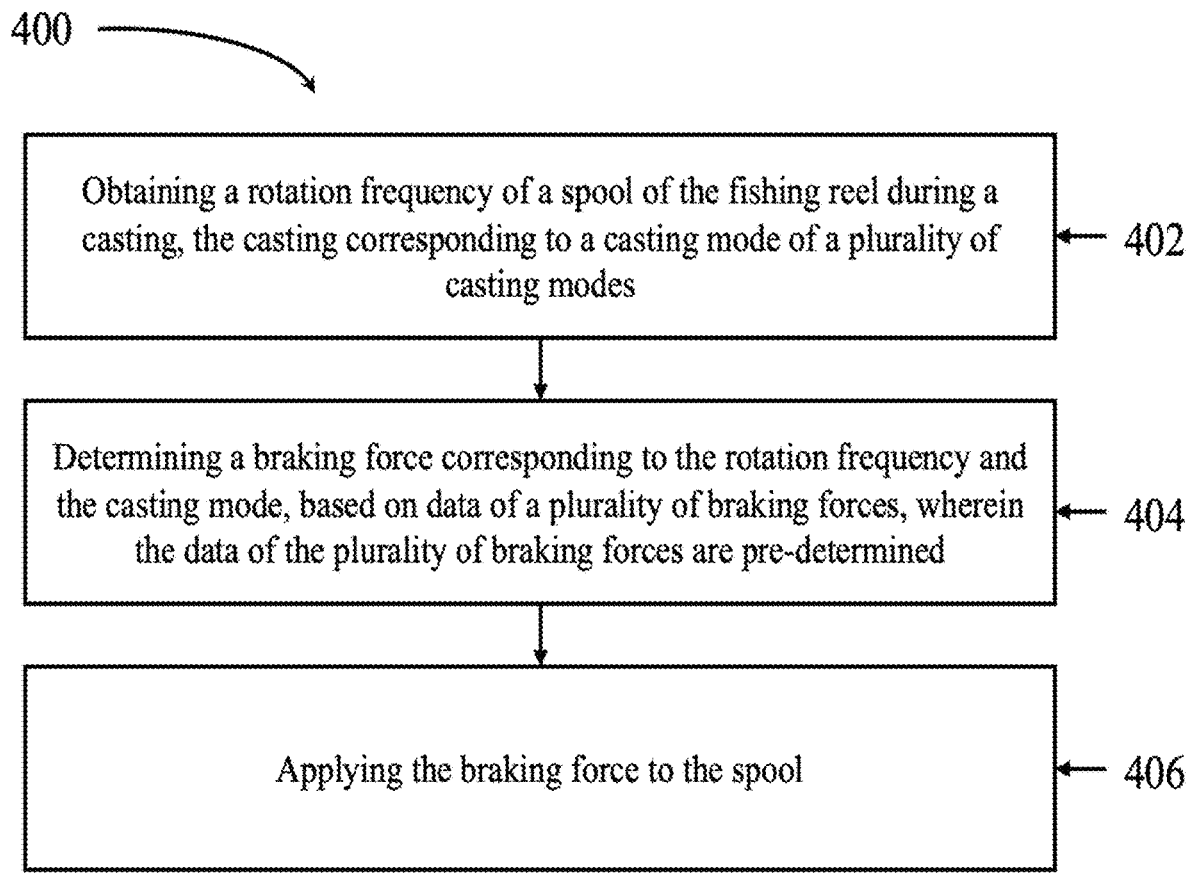
FIG. 4 illustrates a method, according to some embodiments of the present disclosure.

FIG. 4 illustrates a method 400 implemented by a fishing reel, according to some embodiments of the present disclosure. The fishing reel may be the fishing reel 100, as described above in FIGS. 1A-1E.

As shown in FIG. 4, at block 402, the method 400 includes obtaining a rotation frequency of a spool of the fishing reel during a casting, the casting corresponding to a casting mode of a plurality of casting modes. At block 404, the method 400 includes determining a braking force corresponding to the rotation frequency and the casting mode, based on data of a plurality of braking forces, wherein the data of the plurality of braking forces are pre-determined. At block 406, the method 400 includes applying the braking force to the spool.

Many modifications and other embodiments of the disclosure set forth herein will come to mind to one skilled in the art to which the disclosure pertains having the benefit of the teachings presented in the foregoing description and the associated figures. Therefore, it is to be understood that the disclosure is not to be limited to the specific embodiments disclosed and that modifications and other embodiments are intended to be included within the scope of the appended claims. Moreover, although the foregoing description and the associated figures describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A fishing reel, comprising:
one or more sensors configured to obtain a rotation frequency of a spool of the fishing reel during a casting, the casting corresponding to a casting mode of a plurality of casting modes; and
a computing device comprising a memory and a processor, wherein the memory stores executable instructions that, in response to execution by the processor, cause the computing device to at least:
determine a braking force corresponding to the rotation frequency and the casting mode, based on a plurality of braking forces stored in the memory, wherein each of the plurality of braking forces is pre-determined for a respective one of a plurality of rotation frequency ranges of the spool corresponding to the casting mode; and
apply the braking force to the spool.

2. The fishing reel of claim 1, wherein the plurality of casting modes include general casting mode, pitching mode, long cast mode, large profile mode, light lure mode, and skipping mode.

3. The fishing reel of claim 1, wherein the one or more sensors being configured to obtain the rotation frequency of the spool includes being configured to obtain a first rotation frequency of the spool and a second rotation frequency of the spool.

4. The fishing reel of claim 3, wherein the first rotation frequency corresponds to a rising phase of the casting, and wherein the second rotation frequency corresponds to a declining phase of the casting.

5. The fishing reel of claim 4, wherein the computing device being caused to determine the braking force includes being caused to:
determine a first braking force corresponding to the first rotation frequency and the casting mode; and
determine a second braking force corresponding to the second rotation frequency and the casting mode.

6. The fishing reel of claim 5, wherein the computing device being caused to apply the braking force to the spool includes being caused to apply the first braking force to the spool during the rising phase and apply the second braking force to the spool during the declining phase.

7. The fishing reel of claim 1, wherein the computing device being caused to apply the braking force to the spool includes being caused to adaptively change the braking force according to a change of the rotation frequency.

8. A method implemented by a fishing reel, comprising:
obtaining a rotation frequency of a spool of the fishing reel during a casting, the casting corresponding to a casting mode of a plurality of casting modes;
determining a braking force corresponding to the rotation frequency and the casting mode, based on a plurality of braking forces stored in a memory of the fishing reel, wherein each of the plurality of braking forces is pre-determined for a respective one of a plurality of rotation frequency ranges of the spool corresponding to the casting mode; and applying the braking force to the spool.

9. The method of claim 8, wherein the plurality of casting modes include general casting mode, pitching mode, long cast mode, large profile mode, light lure mode, and skipping mode.

10. The method of claim 8, wherein obtaining the rotation frequency of the spool includes obtaining a first rotation frequency of the spool and a second rotation frequency of the spool.

11. The method of claim 10, wherein the first rotation frequency corresponds to a rising phase of the casting, and wherein the second rotation frequency corresponds to a declining phase of the casting.

12. The method of claim 11, wherein determining the braking force includes:

determining a first braking force corresponding to the first rotation frequency and the casting mode; and determining a second braking force corresponding to the second rotation frequency and the casting mode.

13. The method of claim 12, wherein applying the braking force to the spool includes applying the first braking force to the spool during the rising phase and applying the second braking force to the spool during the declining phase.

14. The method of claim 8, wherein applying the braking force to the spool includes being caused to adaptively change the braking force according to a change of the rotation frequency.

* * * * *